United States Patent
Sauer

(10) Patent No.: US 8,240,396 B2
(45) Date of Patent: Aug. 14, 2012

(54) TOOL WITH AN OSCILLATING HEAD

(75) Inventor: Hermann Sauer, Stipshausen (DE)

(73) Assignee: Sauer GmbH, Stipshausen (DE)

(*) Notice: Subject to any disclaimer, the term of this patent is extended or adjusted under 35 U.S.C. 154(b) by 0 days.

(21) Appl. No.: 11/631,452

(22) PCT Filed: Jul. 2, 2004

(86) PCT No.: PCT/EP2004/007216
§ 371 (c)(1),
(2), (4) Date: Apr. 20, 2007

(87) PCT Pub. No.: WO2006/002675
PCT Pub. Date: Jan. 12, 2006

(65) Prior Publication Data
US 2008/0041604 A1  Feb. 21, 2008

(51) Int. Cl.
*B06B 1/04* (2006.01)
*B06B 4/06* (2006.01)
(52) U.S. Cl. .......... 173/213; 173/200; 173/117; 173/79; 310/317; 310/367; 310/328; 318/122; 318/126; 335/213; 335/220; 335/229; 335/268
(58) Field of Classification Search .......... 173/213, 173/200, 117, 79; 310/325, 367, 50, 328, 310/333, 323.18, 317; 318/319, 120, 121, 318/116, 122, 126; 335/213, 220, 229, 230, 335/231, 241, 266, 268
See application file for complete search history.

(56) References Cited

U.S. PATENT DOCUMENTS

| 782,312 | A | * | 2/1905 | Zehden | 310/13 |
| 2,950,088 | A | * | 8/1960 | Scott | 173/200 |
| 4,524,543 | A | * | 6/1985 | Inoue | 451/124 |
| 4,611,742 | A | * | 9/1986 | Rieker et al. | 227/131 |
| 4,799,557 | A | * | 1/1989 | Jacquemet | 173/91 |
| 5,140,773 | A | | 8/1992 | Miwa et al. | |

(Continued)

FOREIGN PATENT DOCUMENTS

DE    19944734 A1 * 4/2001

(Continued)

OTHER PUBLICATIONS

Chinese Office Action issued on Mar. 7, 2008 in the corresponding Chinese Application No. 200480043494.6.

*Primary Examiner* — Paul R. Durand
*Assistant Examiner* — Michelle Lopez
(74) *Attorney, Agent, or Firm* — Ohlandt, Greeley, Ruggiero & Perle, LLP

(57) ABSTRACT

The invention relates to a tool that includes a tool holder, which has on its first end a tool holder recess that is adapted to the contours of a rotating spindle driver and a tool recess on a second end that lies opposite the first end. The tool holder also includes a tool head that can be inserted into the tool recess. For the optimal machining of a workpiece, attempts were previously made to provide an oscillating unit in the spindle of the machine, to initiate oscillations in the tool head. The disadvantage of said known constructions is that all available tools have to be synchronized with the oscillation unit. The invention overcomes said disadvantage by equipping the tool holder with an oscillating motor.

4 Claims, 4 Drawing Sheets

U.S. PATENT DOCUMENTS

Figure 1:
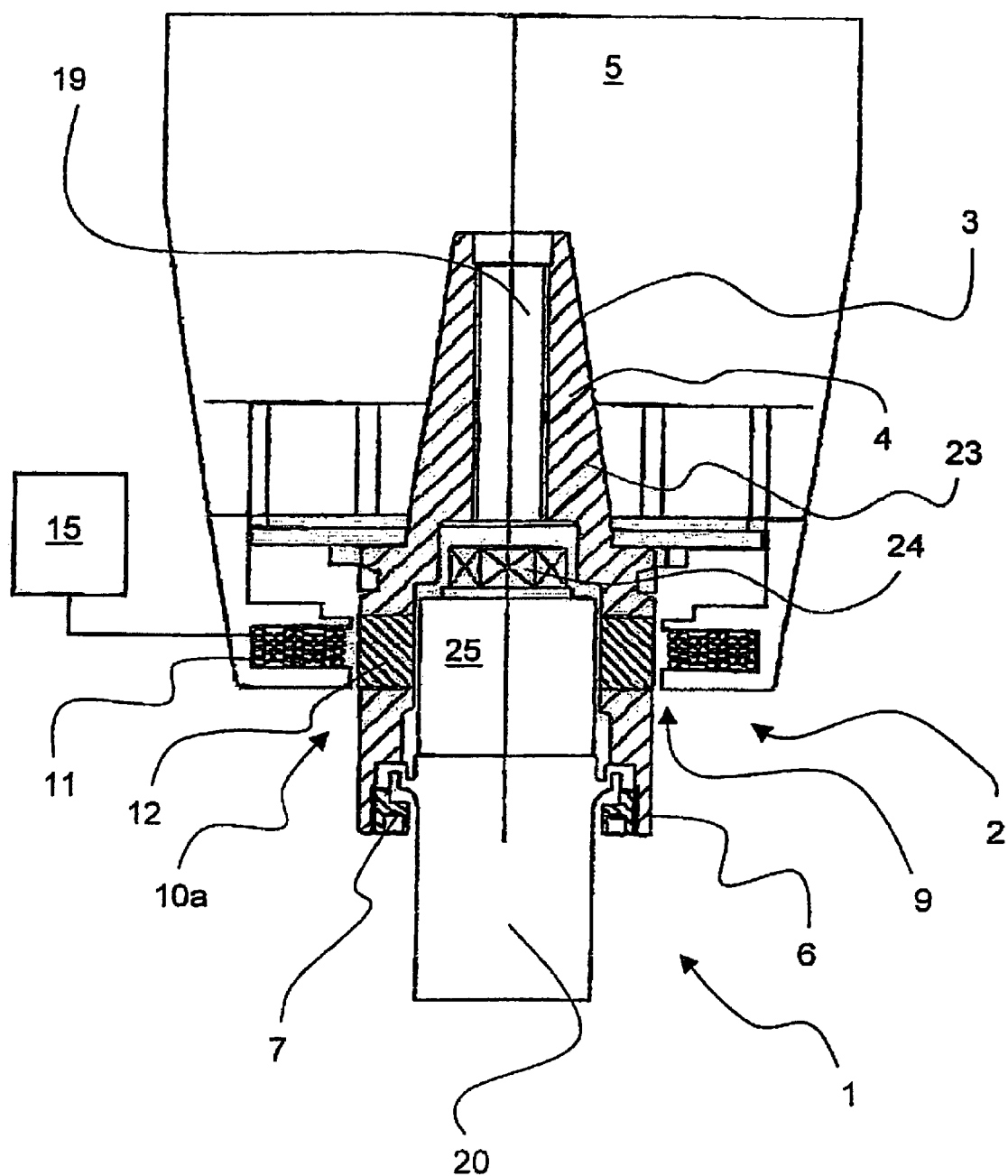

| | | | | |
|---|---|---|---|---|
| 5,236,053 | A * | 8/1993 | Butsch | 173/176 |
| 5,345,127 | A * | 9/1994 | New | 310/90.5 |
| 5,361,543 | A * | 11/1994 | Bory | 451/165 |
| 5,387,834 | A * | 2/1995 | Suzuki | 310/317 |
| 5,593,134 | A * | 1/1997 | Steber et al. | 251/129.17 |
| 6,091,314 | A * | 7/2000 | Wright et al. | 335/220 |
| 6,454,021 | B1 * | 9/2002 | Watanabe | 173/114 |
| 6,585,462 | B1 * | 7/2003 | Goransson | 409/231 |
| 6,731,047 | B2 * | 5/2004 | Kauf et al. | 310/317 |
| 7,019,436 | B2 * | 3/2006 | Rueger et al. | 310/316.03 |
| 7,175,506 | B2 * | 2/2007 | Fiebelkorn et al. | 451/11 |
| 2001/0020808 | A1 | 9/2001 | Suzuki et al. | |
| 2008/0088262 | A1 * | 4/2008 | Bolz | 318/116 |

FOREIGN PATENT DOCUMENTS

| | | |
|---|---|---|
| JP | 58-059701 A | 4/1983 |
| JP | 03-228507 A | 10/1991 |
| WO | WO 03/061886 A1 | 7/2003 |

* cited by examiner

TOOL WITH AN OSCILLATING HEAD

BACKGROUND OF THE INVENTION

1. Field of the Invention

The invention relates to a tool with a tool holder and a tool head that can be inserted into the tool holder, with the tool holder at a first end being provided with a tool holder recess for adapting to a rotary spindle driver, and at a second end, opposite the first one, with a tool recess.

2. Description of Related Art

Commonly machine tools are provided with a rotary spindle, which have a spindle driver at their end, into which, according to the work piece to be processed and the predetermined form, different tools can be inserted, in particular cutting heads.

For an optimum processing of a work piece, in the past some attempts have been undertaken to arrange an oscillating unit at the spindle in the machine, in order to oscillate the tool head. The disadvantage of these known constructions lies in the necessity to adjust all tools available to the oscillating unit. This procedure is very expensive and frequently unsuccessful, because the tools themselves are made to oscillate, which compensates the frequency and the amplitude and furthermore leads to a considerable development of heat.

Therefore the invention is based on the object to provide a tool, which can be operated in a particularly effective manner with in a predetermined frequency range.

The object is attained according to the invention in a tool which comprises an oscillating motor.

This results in the advantage that the tool no longer needs to be adjusted to the oscillating unit of the machine. Rather, according to the invention, each tool is provided with an oscillating motor adjusted thereto, so that the tools can be produced in a standardized manner. The oscillating motor cooperates with a conventional high frequency generator arranged outside the tool Said high frequency generator provides an alternating voltage of a frequency ranging from 17 to 60 kHz, which is essentially equivalent to the oscillating frequency of the tool. Here, a longitudinal wave propagation of 100 µm is possible with a simultaneous rotation up to 40,000 rpms. For varying applications it is also possible to provide different oscillating motors to cover various frequency ranges. In addition to an active tool actuation the tool according to the invention can also serve as a process sensor and detect processing data during production.

BRIEF SUMMARY OF THE INVENTION

In a first preferred embodiment the oscillating motor oscillates the tool holder via a ferro-magnetic system. In this embodiment the tool holder is oscillated via a permanently alternating electro-magnetic field, with the change of polarity depending on the polarity of the frequency of the alternating voltage applied. In this embodiment the transfer of electric energy to the rotary tool is not necessary.

Advantageously, the ferro-magnetic system comprises an exciter coil, arranged in a locally fixed manner, and a ferromagnetic head arranged at the tool holder in a torque-proof fashion. The ferro-magnetic head is produced from a ferromagnetic material, such as a ferro-magnetic ceramic, for example.

Advantageously, the oscillating motor cooperates with the exciter coil in a touch less fashion. The advantage resulting therefrom is the particularly low-wear operation and the lack of susceptibility, for example to leaking coolant.

In the circumferential direction the ferro-magnetic head can be concentrically surrounded by the exciter coil. This results in a particularly homogenous electric field with a constant, evenly intense oscillation of the oscillating motor.

Preferably a cladding tube is arranged between the ferromagnetic head and the exciter coil, with the cladding tube advantageously being made from ceramics or carbon fiber material. In any case the cladding tube must be produced from a non-magnetic material so that the ferro-magnetic head is located in the electro-magnetic field of the exciter coil.

The cladding tube may be arranged in a locally fixed manner in reference to the rotary tool or, alternatively, be integrated in the tool holder like a sleeve. In the second embodiment the holding tube is an integral component of the holding sheath and rotates together with it.

According to a second preferred embodiment the oscillating motor oscillates the tool holder via a piezo-system. In this case, electric energy is transferred to the rotating tool and the oscillation is created inside the tool.

The piezo-system may comprise a first fixed coil and, at a distance therefrom, a second coil engaging the tool holder, with the second coil being connected to piezo actuators. The piezo actuators surround the tool recess in a circular fashion and oscillate when an alternating voltage is applied, for example with an amplitude of 8 µm. Longer oscillation amplitudes can be created such that several of these piezo actuators are arranged over top of each other and electrically connected.

The first and second coils should be positioned over top of each other and surround the tool holder in a circular fashion. This embodiment also allows a touch less excitement of the oscillating motor.

As an alternative to the above-described embodiment it has proven advantageous for the piezo-system to comprise at least two locally fixed carbon brushes contacting slip rings arranged at the tool holder, with the slip rings being connected to piezo-actuators. This embodiment can operate without any electric coils, because the electric energy is transferred to the tool via the carbon brushes and slip rings and is made to oscillate on the tool by the piezo-actuator.

In all embodiments it is advantageous to embody the tool holder with a coolant channel extending in the axial direction. This embodiment allows not only to cool the tool head but also the oscillating motor.

BRIEF DESCRIPTION OF THE SEVERAL VIEWS OF THE DRAWING(S)

Figure 2:
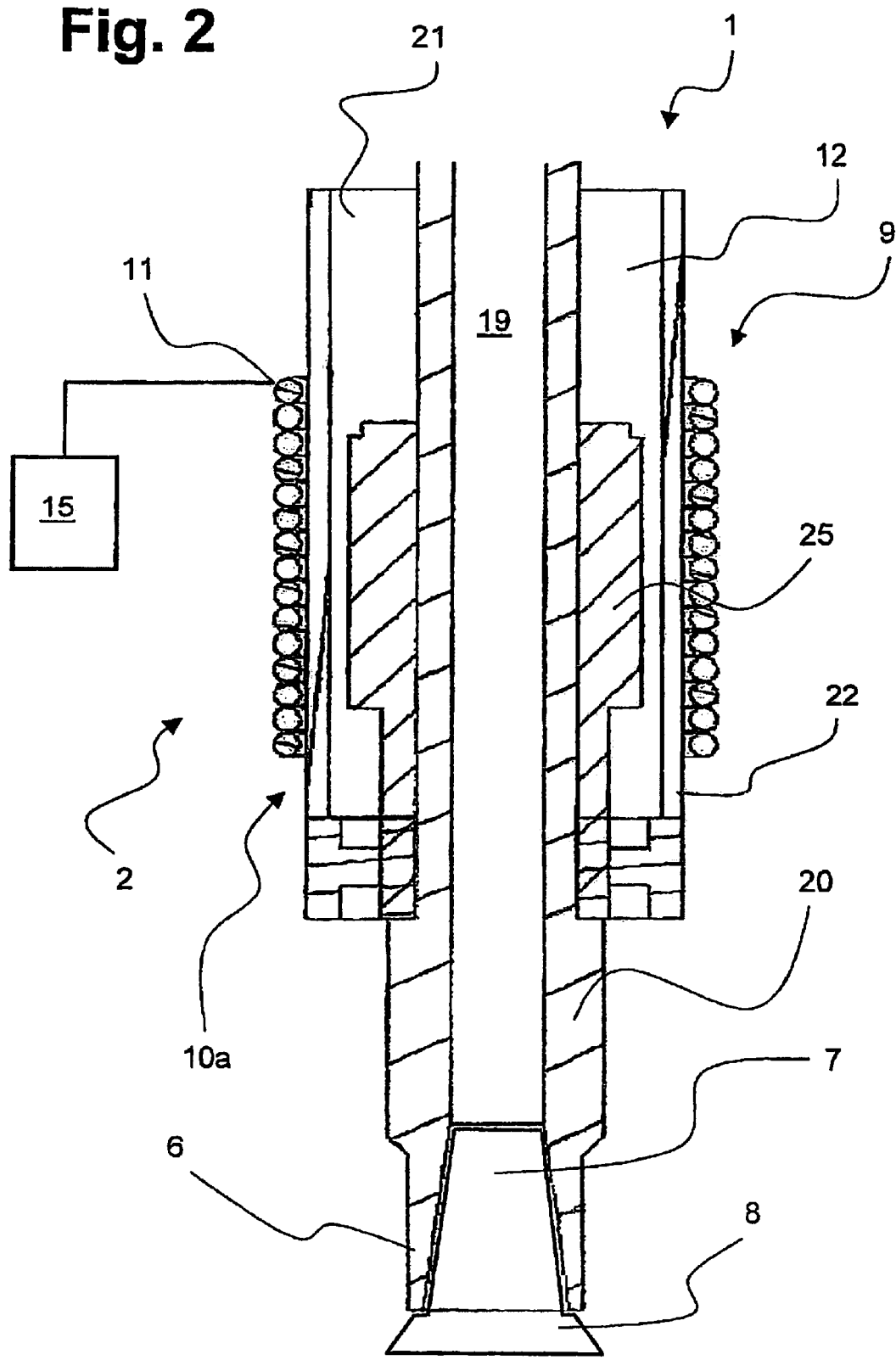
Figure 3:
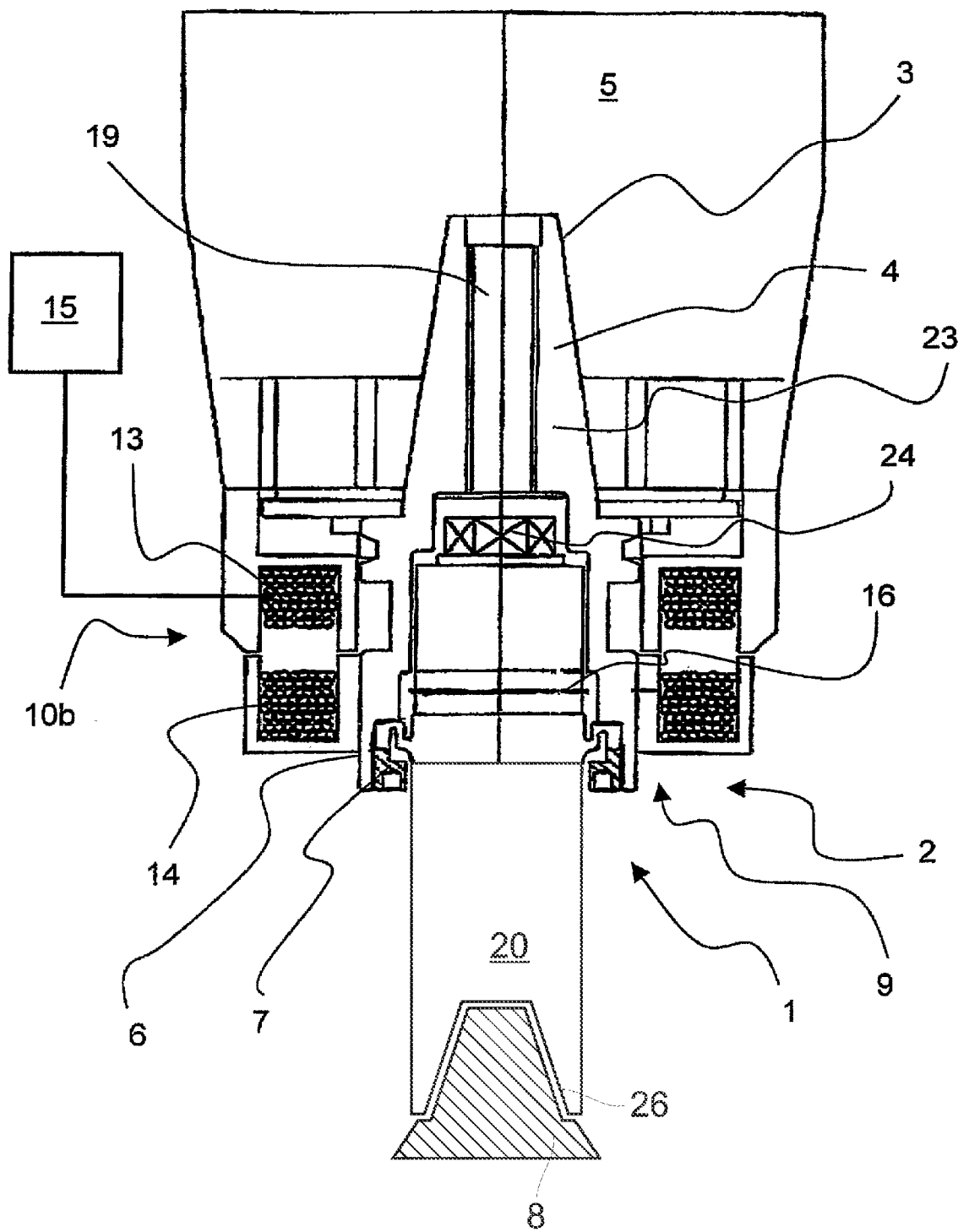
Figure 4:
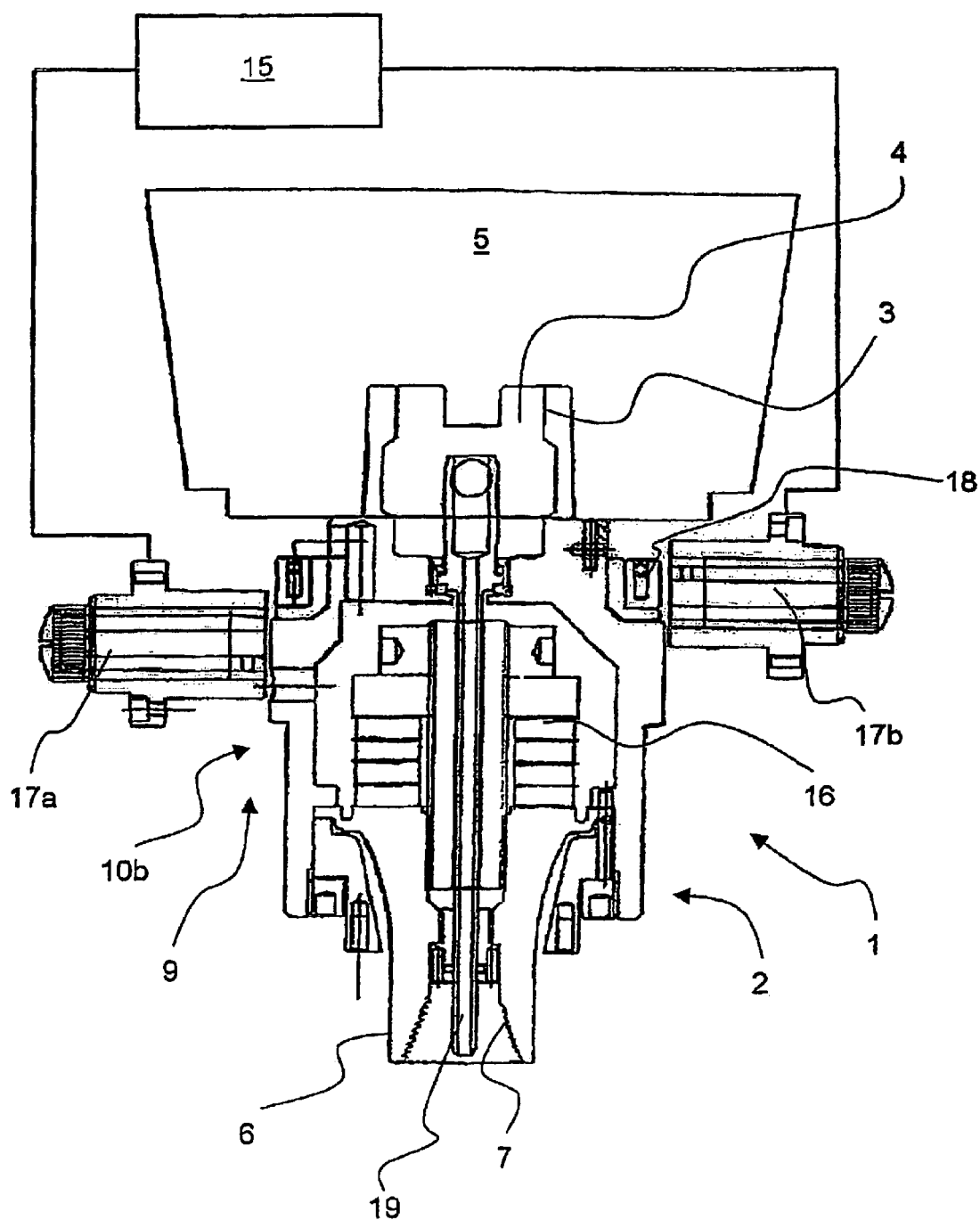

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the following, the invention is explained in greater detail using a total of four drawings. They show:

FIG. 1: a cross-section through a tool holder inserted into a spindle driver according to a first embodiment, having a ferromagnetic system;

FIG. 2: a cross-section through a tool according to a second embodiment, having a ferro-magnetic system;

FIG. 3: a cross-section through a tool holder inserted into a spindle driver according to a third embodiment, having a piezo-system;

FIG. 4: a cross-section through a tool holder inserted into a spindle driver according to a fourth embodiment, having a piezo-system.

DETAILED DESCRIPTION OF THE INVENTION

FIG. 1 shows in a first embodiment a cross-section of a tool holder 2, which is inserted with its conical tool holder recess 4, arranged at the upper end 3, into a spindle driver 5 of an automatic tool, embodied in a complementary manner and not shown in detail, secured against rotation.

The tool holder 2 is designed in two parts and comprises a carrier element 23 and a primary spindle shaft 20, held by a nut 24, and protruding from the carrier element 23. The torque is transferred from the spindle driver 5 to the tool holder recess 4, which is an integral component of the carrier element 23, and therefrom to the primary spindle shaft 20.

The primary spindle shaft 20 is additionally supported in a tool recess 7 of the carrier element 23, with said support being a labyrinth bearing allowing the oscillation of the primary spindle shaft 20 in the axial direction.

A ferro-magnetic head 25 is located on the primary spindle shaft 20, surrounded by a cladding tube 12 inserted into the carrier element 23 of the tool holder 2. In this embodiment the cladding tube 12 rotates together with the ferro-magnetic head 25 and the primary spindle shaft 20.

The tool holder 2 is surrounded by an exciter coil 11 radially distanced therefrom and arranged in a locally fixed manner, by which an electric field can be created. The exciter coil 11 is impinged by an alternating voltage from a high-frequency generator 15, resulting in a pulsing electro-magnetic field with alternating polarity. The electro-magnetic field oscillates the ferro-magnetic head 25 and the primary spindle shaft 20 with the tool head 8 connected thereto, not shown in FIG. 1. The ferro-magnetic head 25 and the exciter coil 11 combined form a ferro-magnetic system 10a of an oscillating motor 9.

The coolant supply of the tool head 8 shown in FIG. 2 occurs via the spindle driver 5 in a coolant channel 19 extending through the carrier element 23 and the hollow primary spindle shaft 20. Here, too, the coolant is guided through the tool holder 2.

FIG. 2 shows in a cross-section a tool 1 according to a second embodiment. The tool 1 comprises the tool holder 2, which is provided at its lower end 6 with a conically tapering threaded bore as a tool recess 7. A tool head 8, provided with an also conical thread, is screwed into the tool recess 7.

The tool holder 2 first comprises a centrally arranged primary spindle shaft 20, extending in a tubular manner from the spindle driver 5, not discernible in FIG. 2, to the tool head 8 mounted at the end. The primary spindle driver 20 transfers the torque of the machine tool to the tool head 8 and furthermore provides for a constant supply of coolant to the tool head 8. For this purpose the primary spindle shaft 20 is embodied in a tubular manner and having a coolant channel 19.

The ferro-magnetic head 25 is mounted in a torque-proof fashion to the primary spindle shaft 20. Known shaft-hub-connections are used as protection against distortion.

The ferro-magnetic head 25 is a component of the ferro-magnetic system 10a, which additionally comprises the exciter coil 11 arranged in a locally fixed manner.
The exciter coil 11 is arranged coaxially around the ferro-magnetic head 25, with the axial alignment of the exciter coil 11 coinciding with the axial alignment of the ferro-magnetic head 25.

Mechanically decoupled from the ferro-magnetic head 25, said head is surrounded by a fixed cladding tube 12 made from carbon fibers. Said cladding tube 12 primarily ensures the electric separation of the oscillating motor 9 from the exciter coil 11.

The cladding tube 12 entirely surrounds the ferro-magnetic head 25 in the circumferential direction and is open at its upper end 21 and its lower end 22. During operation of the machine tool coolant exits at various points and thus is not only fed through the coolant channel 19 to the tool head 8 but also runs down the exterior wall of the primary spindle shaft 20. Due to the openly constructed embodiment of the cladding tube 12 any congestion of coolant in the circular space between the primary spindle shaft 20 and/or the ferro-magnetic head 25 and the cladding tube 12 is avoided.

The axial length of the cladding tube 12 is embodied considerably longer than the axial extension of the ferro-magnetic head 25 or the exciter coil 11 arranged in a locally fixed manner. This avoids that based on splashing coolant a short develops between the exciter coil 11 and the ferro-magnetic head 25.

A third alternative embodiment is shown in FIG. 3, in which the oscillation of the tool 1 is achieved via a piezo-system 10b as the oscillating motor 9. The essential components of the piezo-system 10b are the first and second coils 13, 14, and the piezo actuators 16 located on the tool holder. Here, the tool holder 2 is also connected in a torque-proof manner to the spindle driver 5 via the tool holder recess 4.

The design of the tool holder 2 is not made in two parts but in three parts. In addition to the construction parts carrier element 23 and primary spindle driver 20 the embodiment according to FIG. 3 is provided with the second coil 14 connected to the carrier element 23 in a fixed manner.

The first coil 13 is arranged in a fixed manner between the spindle driver 5 and the second coil 14. Said first coil 13 is connected via connection wires to the high-frequency generator 15 arranged outside the tool 1 and a high-frequency voltage is supplied therefrom.

The second coil 14 entirely surrounds the tool holder 2 in its circumferential direction and is connected to two piezo-actuators 16 arranged over top of each other on the tool holder 2. Here, the second coil 14 is located in the axial direction at the height of the piezo actuator 16. Both coils 13, 14 are essentially separated from the tool holder 2 by design.

The fourth alternative embodiment is also shown based on a piezo-system 10b in FIG. 4. Different from the above-described embodiments, here the electric supply of the tool holder 2 is not touch less, but it is embodied via two cable brushes 17a, 17b and slip rings 18 located at the tool holder 2.

The cable brushes 17a, 17b are arranged at the opposite sides of the tool holder 2, with the first carbon brush 17a being connected to a voltage output and the second carbon brush 17b to the ground of the high-frequency generator 15. The respective cable brushes 17a, 17b each contact a slip ring 18, with the two slip rings 18 being electrically separated from each other.

The slip rings 18 entirely surround the tool holder 2 in its circumferential direction and are connected to four piezo-actuators 16 arranged over top of each other. They in turn determine the frequency of the oscillating motor 9.

A conical bore is discernible as a tool recess 7 at the second end 6 of the tool holder 2. The tool recess 7 is connected to a coolant channel 19 entirely extending in the axial direction through the tool holder 2.

LIST OF REFERENCE CHARACTERS 1 tool
2 tool holder 3 first/upper end of tool holder
4 tool holder recess
5 spindle driver
6 second/lower end of tool holder
7 tool recess
8 tool head
9 oscillating motor
10a ferro-magnetic system
10b piezo-system
11 exciter coil arranged in a locally fixed manner
12 cladding tube
13 first fixed coil
14 second coil
15 high-frequency generator
16 piezo-actuator
17a first carbon brush
17b second carbon brush
18 slip ring
19 coolant channel
20 primary spindle shaft
21 upper end of cladding tube
22 lower end of cladding tube
23 carrier element
24 nut
25 ferro-magnetic head It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A tool comprising a tool holder and a rotating spindle driver; with the tool holder comprising a carrier element and a primary spindle shaft and being provided at a first end with a tool holder recess for adapting to the rotating spindle driver and at a second end with a first tool recess supporting the primary spindle shaft and allowing the oscillation of the primary spindle shaft in an axial direction of the spindle shaft, and with a tool head that can be inserted into a second tool recess of the primary spindle shaft, and with the tool holder and the spindle driver forming an oscillating motor, wherein the oscillating motor oscillates the tool holder via a piezo-system and the piezo-system comprises a first fixed coil and a second coil that engages the tool holder, wherein the first coil is located at a distance from the second coil and the second coil is connected to a piezo-actuator and connected with the carrier element in a fixed manner and the first and second coils are located over top of each other with reference to the axial direction of the spindle shaft.

2. The tool according to claim 1, characterized in that the first and second coils surround the tool holder in a circular manner.

3. The tool according to claim 1, characterized in that the first coil is connected to a high-frequency generator.

4. The tool according to claim 1, characterized in that the tool further comprises a coolant channel extending in an axial direction.

\* \* \* \* \*